US011930424B2

(12) United States Patent
Zeng et al.

(10) Patent No.: US 11,930,424 B2
(45) Date of Patent: Mar. 12, 2024

(54) METHOD AND APPARATUS FOR LOCATION BASED GROUP MESSAGE DELIVERY

(71) Applicant: Telefonaktiebolaget LM Ericsson (publ), Stockholm (SE)

(72) Inventors: Hao Zeng, Guangzhou (CN); Jingrui Tao, Guangzhou (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 221 days.

(21) Appl. No.: 17/418,899

(22) PCT Filed: Dec. 29, 2018

(86) PCT No.: PCT/CN2018/125586
§ 371 (c)(1),
(2) Date: Jun. 28, 2021

(87) PCT Pub. No.: WO2020/133406
PCT Pub. Date: Jul. 2, 2020

(65) Prior Publication Data
US 2022/0086604 A1   Mar. 17, 2022

(51) Int. Cl.
*H04W 4/12* (2009.01)
*H04W 4/021* (2018.01)
(Continued)

(52) U.S. Cl.
CPC ............ *H04W 4/12* (2013.01); *H04W 4/021* (2013.01); *H04W 24/08* (2013.01); *H04W 48/16* (2013.01)

(58) Field of Classification Search
CPC ....... H04W 4/12; H04W 4/021; H04W 4/029; H04W 8/08; H04W 24/08; H04W 36/08; H04W 36/32; H04W 48/16; H04W 76/25
See application file for complete search history.

(56) References Cited

U.S. PATENT DOCUMENTS 11,425,762 B2 *   8/2022   Li .................... H04W 76/10
2004/0228324 A1 * 11/2004  Alexiou ............ H04L 67/306
370/352

(Continued)

FOREIGN PATENT DOCUMENTS

CN   104349373 B   10/2018
EP    3182741 A1    6/2017
EP    3386220 A1   10/2018

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 15)," Technical Specification 23.401, Version 15.5.0, 3GPP Organizational Partners, Sep. 2018, 410 pages.

(Continued)

*Primary Examiner* — Jean A Gelin
(74) *Attorney, Agent, or Firm* — Christopher & Weisberg, P.A.

(57) ABSTRACT

A method for Non-IP Data Delivery to a group of UE in the specific geographic area is proposed. The method which may be performed by a exposure function node comprises receiving from an application server node a Non-IP delivery data message including geographic information; determining location area information based on the geographic information; and the method further comprises transmitting to a first node for monitoring event of the at least one UE which are related to the location area. According to the embodiments of the present disclosure, the Non-IP Data can be delivered to at least UE in the specific geographic area, so that it makes the SCS/AS more flexible to deliver the message to UEs in a customer defined Geographic Area in an efficient and simple way.

16 Claims, 9 Drawing Sheets

(51) Int. Cl.
*H04W 24/08* (2009.01)
*H04W 48/16* (2009.01)

(56) References Cited

U.S. PATENT DOCUMENTS

| | | | | |
|---|---|---|---|---|
| 2011/0265116 | A1* | 10/2011 | Stern | H04N 21/6118 |
| | | | | 725/35 |
| 2017/0374694 | A1* | 12/2017 | Kotecha | H04W 8/00 |
| 2018/0054765 | A1* | 2/2018 | Kim | H04W 36/32 |
| 2018/0279115 | A1* | 9/2018 | Tanna | H04W 8/04 |
| 2018/0316979 | A1* | 11/2018 | Brooks | H04N 21/2385 |
| 2018/0332636 | A1* | 11/2018 | Lu | H04W 76/12 |
| 2018/0368202 | A1* | 12/2018 | Landais | H04W 48/12 |
| 2019/0028337 | A1* | 1/2019 | Ryu | H04W 8/02 |
| 2019/0028866 | A1* | 1/2019 | Baek | H04W 4/70 |
| 2019/0124508 | A1* | 4/2019 | Watfa | H04L 63/0876 |
| 2019/0159117 | A1* | 5/2019 | Kuge | H04W 48/17 |
| 2019/0166016 | A1* | 5/2019 | Livanos | H04L 67/61 |
| 2019/0230492 | A1* | 7/2019 | Suzuki | H04W 28/14 |
| 2019/0306753 | A1* | 10/2019 | Uchida | H04W 28/14 |
| 2019/0380060 | A1* | 12/2019 | Huang | H04W 28/0268 |
| 2020/0288515 | A1* | 9/2020 | Gupta | H04W 48/18 |
| 2020/0374746 | A1* | 11/2020 | Zembutsu | H04W 28/0289 |
| 2021/0274575 | A1* | 9/2021 | Talebi Fard | H04W 76/12 |
| 2021/0282038 | A1* | 9/2021 | Li | G06Q 20/4016 |

OTHER PUBLICATIONS

Author Unknown, "Technical Specification Group Services and System Aspects; Architecture enhancements to facilitate communications with packet data networks and applications (Release 15)," Technical Specification 23.682, Version 15.4.0, 3GPP Organizational Partners, Mar. 2018, 124 pages.

Author Unknown, "Technical Specification Group Services and System Aspects; Architecture enhancements to facilitate communications with packet data networks and applications (Release 15)," Technical Specification 23.682, Version 15.6.0, 3GPP Organizational Partners, Sep. 2018, 125 pages.

International Search Report and Written Opinion for International Patent Application No. PCT/CN2018/125586, dated Sep. 27, 2019, 10 pages.

EPO Communication with Supplementary European Search Report dated Jun. 15, 2022 for Patent Application No. 18945100.8, consisting of 8-pages.

SA WG2 Meeting #116BIS Temporary Document S2-164894; Title: Solution for key issue 4: multicast/broadcast architecture for CIoT; Agenda Item: 6.15; Source: Samsung; Work Item/Release: FS_CIoT_ext, Rel-14; Document for Discussion/Agreement; Date and Location: Aug. 29-Sep. 2, 2016, Sanya, P.R. China, consisting of 3-pages.

* cited by examiner

METHOD AND APPARATUS FOR LOCATION BASED GROUP MESSAGE DELIVERY

This application is a 35 U.S.C. § 371 national phase filing of International Application No. PCT/CN2018/125586, filed Dec. 29, 2018, the disclosure of which is incorporated herein by reference in its entirety.

FIELD OF THE INVENTION

The present disclosure generally relates to communication networks, and more specifically, to delivery of data in cellular communication networks.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. To meet the diverse requirements of new services across a wide variety of industries, The Third Generation Partnership Project (3GPP) specifications has provided support for Non-Internet Protocol (IP) (Non-IP) Data Delivery (NIDD) as part of the Cellular Internet of Things (CIoT) Evolved Packet System (EPS) optimizations. 3GPP defines a "Mobile Terminated (MT) Non-Internet Protocol Data Delivery (MT NIDD) procedure," which is illustrated in FIG. 1 and FIG. 2. In this procedure, a Service Capability Server (SCS)/Application Server (AS) sends Non-IP data to a group of UEs which are defined by the same External Group Identifier.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A Service Capability Server (SCS)/Application Server (AS) sends MT NIDD to a group of UEs which are defined by the same External Group Identifier. However, these kinds of method may not meet the specific requirement of MT NIDD message to multiple UE in a group which are in the specific Geographic Area. Thus, it is desirable to improve the method of MT NIDD.

The present disclosure proposes a solution of MT NIDD combined with the geographic information in a communication network, which can enable network nodes such as SCS/AS to send MT NIDD message to multiple UEs in a group which are in the specific Geographic Area. It makes the SCS/AS more flexible to deliver the message to UEs in a customer defined Geographic Area in an efficient and simple way.

According to a first aspect of the present disclosure, there is provided a method performed by a Service Capability Exposure Function (SCEF). The method comprises receiving from SCS/AS a first request message which sending MT NIDD to at least one User Equipment (UE) in a specific geographic area, wherein the first request message includes geographic information; the method further comprises determining location area information based on the geographic information; and sending a second request to a first node, such as Home Subscriber Server (HSS) for monitoring event of the at least one UE, wherein the second request includes the location area information.

In accordance with an exemplary embodiment, the method according to the first aspect of the present disclosure, wherein the first request further comprises an external group identifier.

In accordance with an exemplary embodiment, the method according to the first aspect of the present disclosure, wherein the first request is a MT NIDD submit request message.

In accordance with an exemplary embodiment, the method according to the first aspect of the present disclosure, wherein the second request may further comprise the Mobile Management Entity (MME) list.

In accordance with an exemplary embodiment, the method according to the first aspect of the present disclosure may further comprise receiving from the second network node the monitoring indication message indicating the reachability of the at least one UE within the location area.

In accordance with an exemplary embodiment, the method according to the first aspect of the present disclosure may further comprise sending to the second network node a MT NIDD submit request message.

In accordance with an exemplary embodiment, the method according to the first aspect of the present disclosure may further comprise: receiving from the second network node the MT NIDD submit response message; and sending, toward the application server, the group MT NIDD submit response message.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus may comprise a determining unit and a transmitting unit. In accordance with some exemplary embodiments, the determining unit may be operable to carry out at least the determining step of the method according to the first aspect of the present disclosure. The transmitting unit may be operable to carry out at least the transmitting step of the method according to the first aspect of the present disclosure.

According to a fifth aspect of the present disclosure, there is provided a method performed by at a first network node, such as a HSS, in a wireless communication network. The method comprises receiving from an exposure function node, such as a SCEF, a second request for monitoring event of the at least one UE, wherein the second request includes the location area information; and sending to a second network node such as a MME or Serving GPRS Support Node (SGSN), a third request for monitoring the reachability of at least one UE within the location area.

In accordance with an exemplary embodiment, the method according to the fifth aspect of the present disclosure, wherein the second request further comprising an external group identifier.

In accordance with an exemplary embodiment, the method according to the fifth aspect of the present disclosure, wherein the second request may further comprise a MME list.

In accordance with an exemplary embodiment, the method according to the fifth aspect of the present disclosure may further comprise determining the MME list based on the location area information.

In accordance with an exemplary embodiment, the method according to the fifth aspect of the present disclosure may further comprise determining the at least one second node based on the MME list.

In accordance with an exemplary embodiment, the method according to the fifth aspect of the present disclosure, wherein the second request is a monitoring request message.

In accordance with an exemplary embodiment, the method according to the fifth aspect of the present disclosure may further comprise sending toward the exposure function node a monitoring response message indicating acknowledge acceptance of the monitoring request.

In accordance with an exemplary embodiment, the method according to the fifth aspect of the present disclosure, wherein the third request comprises the location area information, external group identifier.

In accordance with an exemplary embodiment, the method according to the fifth aspect of the present disclosure may further comprise: receiving, from the second network node, an insert subscriber data answer message indicating acceptance of the third request.

In accordance with an exemplary embodiment, the method according to the fifth aspect of the present disclosure may further comprise: receiving, from the second network node, an update location request message indicating a new UE handover into the range of the second network node;

In accordance with an exemplary embodiment, the method according to the fifth aspect of the present disclosure may further comprise: determine a monitoring event configuration based on the external group identifier and the MME Identifier (MME ID); and sending, toward the second network node, an update location answer message with the monitoring event configuration and the location area information.

According to a sixth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus. The apparatus may comprise a receiving unit and optionally a determining unit. In accordance with some exemplary embodiments, the receiving unit may be operable to carry out at least the receiving step of the method according to the fifth aspect of the present disclosure. The determining unit may be operable to carry out at least the determining step of the method according to the fifth aspect of the present disclosure.

According to a ninth aspect of the present disclosure, there is provided a method performed by a second network node, such as Mobility Management Entity (MME) or SGSN, in a wireless communication network. The method comprises determining at least one UE based on the external group identifier, MME ID and location area; and monitoring the reachability of the at least one UE.

In accordance with an exemplary embodiment, the method according to the ninth aspect of the present disclosure may further comprise: receiving, from the first network node, an insert subscriber data request message to configure one-time monitoring event;

In accordance with an exemplary embodiment, the method according to the ninth aspect of the present disclosure may further comprise: sending MT NIDD to the at least one UE when the at least one UE is reachable.

In accordance with an exemplary embodiment, the method according to the ninth aspect of the present disclosure may further comprise: sending, toward the first network node, an update location request message indicating a UE handover toward the range of the second network node;

In accordance with an exemplary embodiment, the method according to the ninth aspect of the present disclosure may further comprise: receiving, from the first network node, an update location answer message with the monitoring event configuration and location area information.

In accordance with an exemplary embodiment, the method according to the ninth aspect of the present disclosure may further comprise: deleting the one-time UE monitor event indicating a UE moves out the second network node.

In accordance with an exemplary embodiment, the method according to the ninth aspect of the present disclosure may further comprise: sending, toward the exposure function node, a monitoring indication message indicating a UE reachable, and deleting the one-time monitoring event for the UE.

In accordance with an exemplary embodiment, the method according to the ninth aspect of the present disclosure may further comprise: wherein the sending NIDD to the at least one UE comprising: receiving, from the exposure function node, the NIDD submit request message; and paging the at least one UE; and sending the NIDD toward the at least one UE.

According to a tenth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus. The apparatus may comprise a transmitting unit and a receiving unit. In accordance with some exemplary embodiments, the transmitting unit may be operable to carry out at least the transmitting step of the method according to the ninth aspect of the present disclosure. The receiving unit may be operable to carry out at least the receiving step of the method according to the ninth aspect of the present disclosure.

According to a thirteenth aspect of the present disclosure, there is provided a method performed by an application server. The method comprises sending, to exposure function node, a group MT NIDD submit request message which comprises geographic area information; receiving, from the exposure function, a group MT NIDD submit response message indicating a result of group MT NIDD submit request message.

According to a fourteenth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus. The apparatus may comprise a receiving unit and a transmitting unit. In accordance with some exemplary embodiments, the receiving unit may be operable to carry out at least the receiving step of the method according to the thirteenth aspect of the present disclosure. The transmitting unit may be operable to carry out at least the transmitting step of the method according to the thirteenth aspect of the present disclosure.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
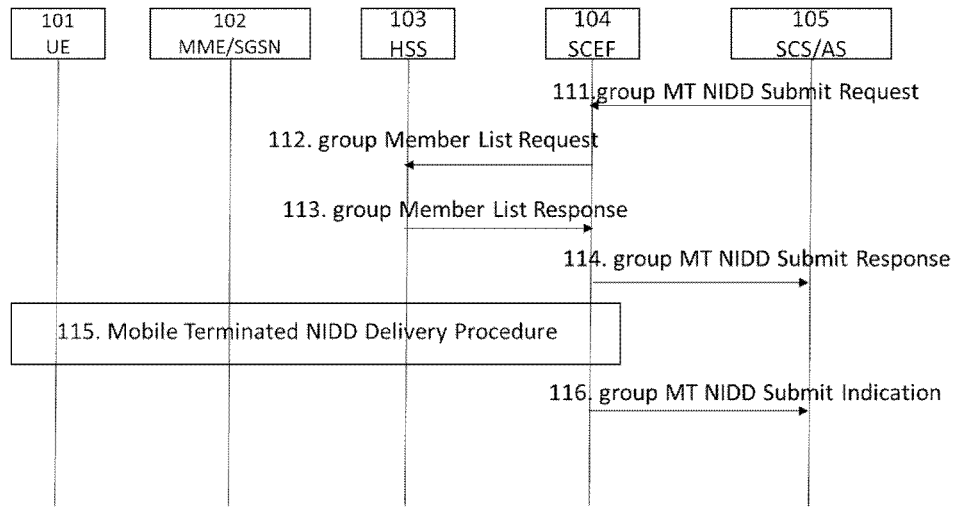
FIG. 1 shows a Group Message Delivery via unicast MT NIDD procedure.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless communication network" refers to a network following any suitable communication standards, such as LTE-Advanced (LTE-A), LTE, new radio (NR) and so on. In the following description, the terms "network" and "system" can be used interchangeably. Furthermore, the communications between a terminal device and a network device in the wireless network may be performed according to any suitable generation communication protocols, including, but not limited to fourth generation (4G) communication protocols such as LTE, fifth generation (5G) communication protocols such as NR, and/or any other protocols either currently known or to be developed in the future.

The term "network device" refers to a network device in a wireless communication network via which a terminal device accesses to the network and receives services therefrom. For example, in a wireless communication network such as a 3GPP-type cellular network, the network device may comprise access network device and core network device. For example, the access network device may comprise base station (BS), an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. The core network device may comprise a plurality of network devices which may offer numerous services to the customers who are interconnected by the access network device. Each access network device is connectable to the core network device over a wired or wireless connection.

The term "network function (NF)" refers to any suitable function which can be implemented in a network device of a wireless communication network. For example, in 5G network, the network function may comprise a plurality of network functions (NFs) such as Authentication Server Function (AUSF), Access and Mobility Management Function (AMF), Data Network (DN) (e.g. operator services, Internet access or 3rd party services), Network Exposure Function (NEF), Network Repository Function (NRF), Network Slice Selection Function (NSSF), Policy Control Function (PCF), Session Management Function (SMF), Unified Data Management (UDM), User Plane Function (UPF), Application Function (AF), User Equipment (UE), (Radio) Access Network ((R)AN), 5G-Equipment Identity Register (5G-EIR), Security Edge Protection Proxy (SEPP), Network Data Analytics Function (NWDAF), Unified Data Repository (UDR), Unstructured Data Storage Function (UDSF), etc.

The term "terminal device" refers to any end device that can access a communication network and receive services therefrom. By way of example and not limitation, in the wireless communication network, the terminal device may refer to a mobile terminal, a user equipment (UE), or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaining terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (TOT) scenario, a terminal device may represent a machine or other device that performs monitoring and/or measurements and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

As used herein, a downlink, DL, transmission refers to a transmission from the network device to a terminal device, and an uplink, UL, transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 2:
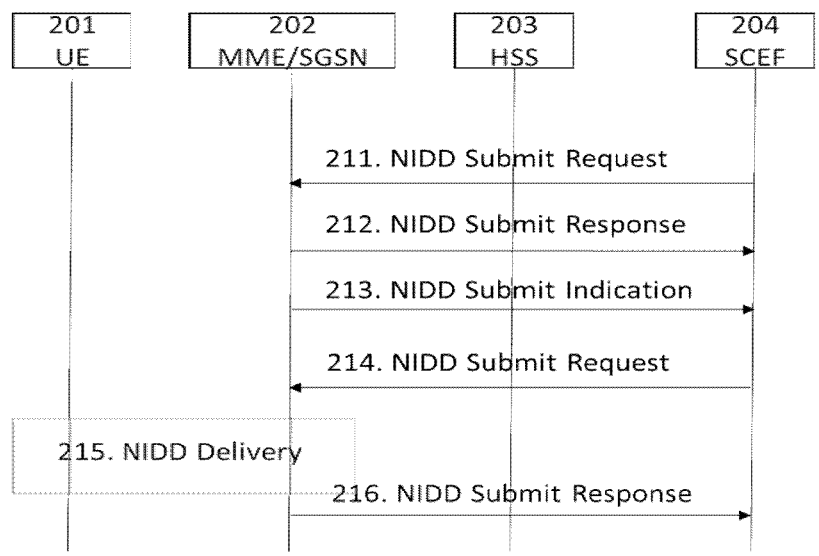
FIG. 2 shows a procedure for MT NIDD.
Figure 3A:
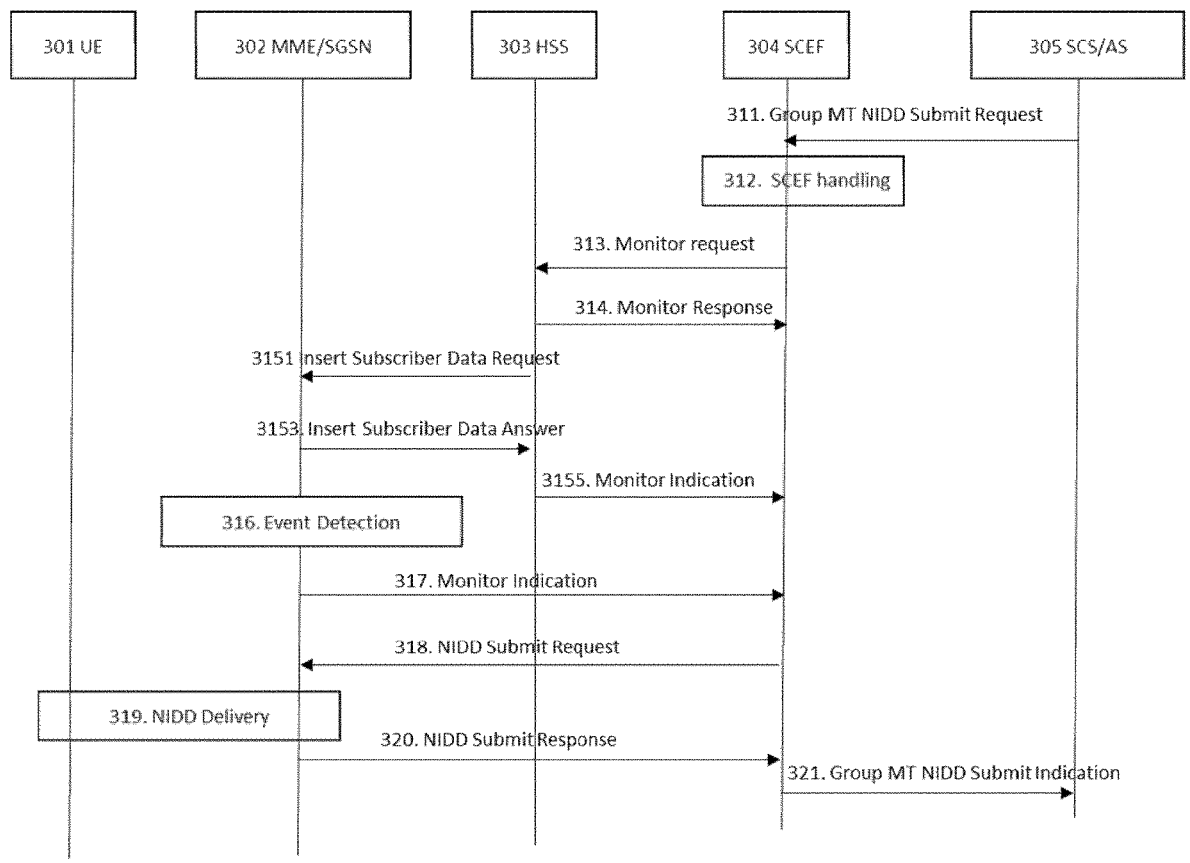
FIG. 3A is a flowchart showing a Group Message Delivery via unicast MT NIDD combined with the geographic area information when the UE is already in the area.
Figure 3B:
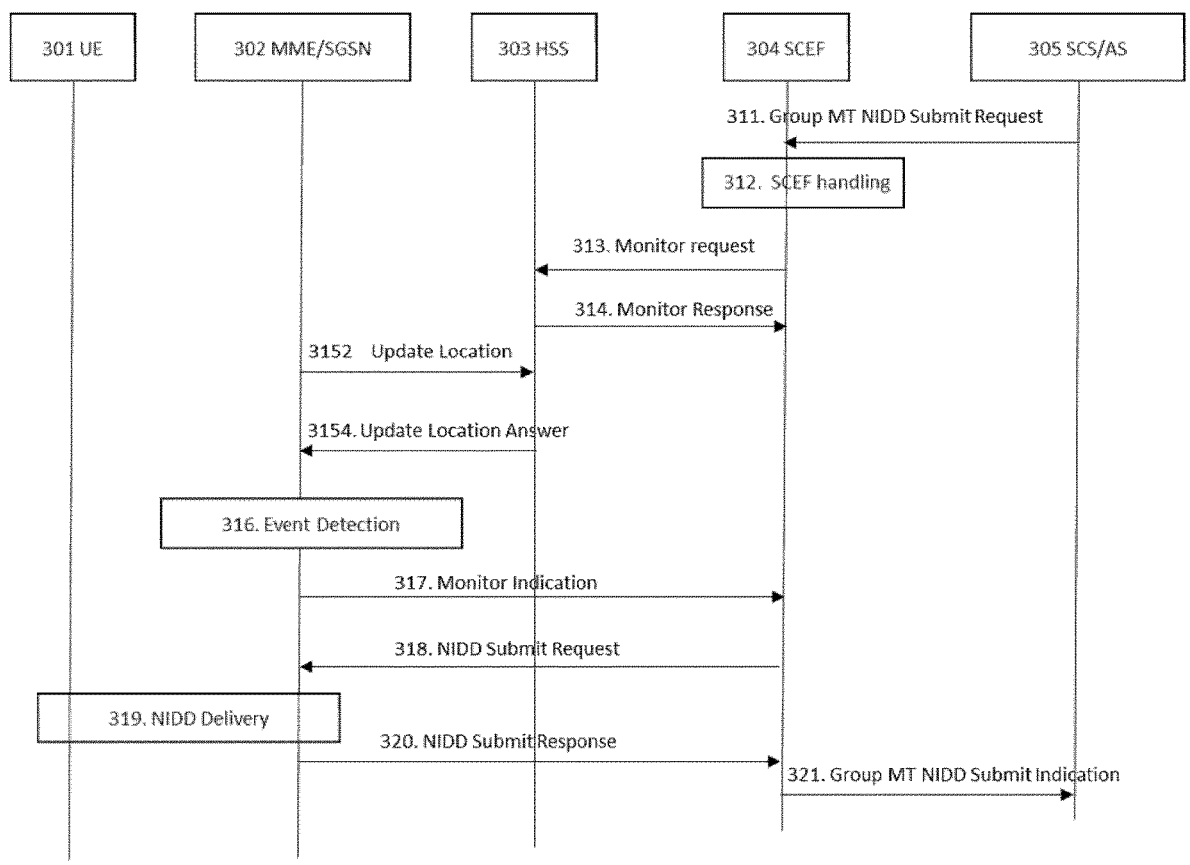
FIG. 3B shows a Group Message Delivery via unicast MT NIDD combined with the geographic area information when UE is outside the area and later move into the area within the required Maximum Latency.

Although the subject matter described herein may be implemented in any appropriate type of system using any suitable components, the embodiments disclosed herein are described in relation to a communication system comprising at least the components as illustrated in FIG. 3A and FIG. 3B. For example, procedures for MT MIDD according to some embodiments of the present disclosure can be applicable in 5G network with the following differences:

description of the server such as SCS/AS applies to the AF;
description of the network device such as SCEF applies to the NEF;
description of the network device such as HSS applies to the UDM;

FIG. 1-2 shows a Group Message Delivery via unicast MT NIDD procedure. The Group Message Delivery feature allows an SCS/AS to deliver a payload to a group of UEs. The Group Message Delivery via unicast MT NIDD is to deliver payload to UEs which are part of the same External Group Identifier.

When the SCEF receives a Group MT NIDD request from the SCS/AS, the SCEF queries the HSS to resolve the group members and forks the message by sending it in a unicast manner to all of the individual UEs that are associated with the External Group Identifier.

As shown in FIG. 1, at step 111, if SCS/AS has downlink non-IP data to send to a group of UEs, the SCS/AS sends a Group MT NIDD Submit Request message to the SCEF.

At step 112, the SCEF sends a Group Member List Request which includes External Group Identifier to the HSS to request an External Identifier for each UE.

At step 113, the HSS sends a Group Member List Response which includes External Identifier(s) to provide the SCEF with the list of the individual member IDs that are associated with the External Group Identifier.

At step 114, the SCEF sends a single Group MT NIDD Submit Response message to the SCS/AS to acknowledge acceptance of the Group MT NIDD Submit Request.

At step 115, the SCEF performs MT NIDD procedure for each External Identifier that was provided to the SCEF at step 113. The SCEF execute the Mobile Terminated NIDD Procedure for each External Identifier as in FIG. 2.

After executing MT NIDD procedure for all UEs, the SCEF sends an aggregated response message Group MT NIDD Submit Indication.

As shown in FIG. 2, at step 211, the SCEF sends a NIDD Submit Request message toward the MME/SGSN.

If the MME/SGSN can immediately deliver the non-IP data to the UE, the procedure proceeds at step 216.

At step 212, if the MME/SGSN is aware of the UE being temporarily unreachable, or if the MME/SGSN knows that the UE is not scheduled to be reachable, then the MME/SGSN may send a NIDD Submit Response message towards the SCEF.

At step 213, when the MME/SGSN detects that the UE is reachable, then the MME/SGSN sends a NIDD Submit Indication message towards the SCEF.

At step 214, the SCEF sends a NIDD Submit Request message toward the MME/SGSN.

At step 215, the MME/SGSN pages the UE and delivers the non-IP data to the UE.

At step 216, the MME/SGSN sends a NIDD Submit Response message towards the SCEF acknowledging the NIDD Submit Request from SCEF.

There may be some problems in scenario as shown in FIGS. 1-2. It can't support the delivery of NIDD MT message to multiple UE in a group which are in the specific Geographic Area, such as list of cells, eNodeBs and/or RAI(s)/TAI(s), etc.

One example is that especially the geographic areas keep changing, such as a highway weather aware message system wherein the system delivers the weather information for highway drivers. The SCS/AS delivers alarm message via MT NIDD to driver in extreme weather case, such as tornado which is location based and could be changed from one area to another area from time to time. During the tornado movement, the weather aware message system might be difficult to deliver the alarm message to specific drivers who are in the areas affected by the tornado.

Another example is that especially the UEs keep moving, such as a shared bicycle system wherein the SCS/AS want to deliver message via MT NIDD to the bicycles at specific period in specific area. The bicycles are always moving in/out the area frequently. It might be difficult for SCS/AS to know which UE will move in/out of the geographic area during the period. Accordingly, it might be difficult to deliver group message to all the UEs in the geographic area during the period.

In order to enhance the transmission efficiency and meet the variable requirement, the present disclosure according to some exemplary embodiments proposes to deliver MT NIDD message combined with the geographic area information, so that SCS/AS can deliver NIDD MT message to a group which is in the Geographic Area, such as list of cells, eNodeBs and/or RAI(s)/TAI(s), etc. It makes the SCS/AS more flexible to deliver the message to UEs in a customer defined Geographic Area in an efficient and simple way. According to the proposed solution, the SCS/AS may inform the SCEF of geographic area information via the Group MT NIDD Submit Request. The HSS determines whether a UE is in the locationArea or not, if a UE is already in the locationArea, the HSS informs MME/SGSN to start to monitor the reachability status of the UE; if a UE is outside of the locationArea, when the UE moves into the location-Area, MME/SGSN starts to monitor the reachability status of the UE; it is noted that when UE moves out the location-Area, MME/SGSN stops the monitoring.

FIG. 3A shows a procedure a Group Message Delivery via unicast MT NIDD combined with the geographic area information when the UE is already in the area according to some embodiments of the present disclosure.

As shown in FIG. 3A, at step 311, the SCS/AS sends a group MT NIDD Submit Request (SCS/AS Identifier, External Group Identifier, non-IP data, Maximum Latency, geographic area) message to the SCEF. A new parameter of "geographic area" is introduced for SCS/AS to send group NIDD message combined geographic area information.

At step 312, the SCEF may map the geographic area to locationArea (a list of cells, eNodeBs and/or RAI(s)/TAI(s), etc.) and MME list. The MME list is at least one MME ID for the geographic area.

At step 313, the SCEF sends a Monitoring Request (External Group Identifier, SCEF Identifier, SCEF Reference Identifier, Monitoring Type, Maximum Number of Reports, Monitoring Duration, locationArea, MME list) message to the HSS to configure the UE reachability Monitoring Event on the MME/SGSN.

It is noted that two new parameters of "locationArea" and/or "MME list" are introduced for SCEF to pass the location information, for example, during the 313, to HSS/SGSN. If HSS can base on locationArea to find the MME list by itself, SCEF will not pass MME list to HSS.

At step 314, the HSS sends a Monitoring Response (SCEF Reference ID, Cause) message to the SCEF to acknowledge acceptance of the Monitoring Request immediately before beginning the processing of individual UEs indicating that Group processing is in progress.

At step 3151, in the scenario that UE is already in the locationArea, for the UEs with the same External Group Identifier, if the MME ID of the UE is in the MME list, HSS sends Insert Subscriber Data Request message for the UE to configure monitoring event.

At step 3153 the MME/SGSN sends an Insert Subscriber Data Answer message to the HSS to accept the monitoring request.

At step 3155 based on the result of Insert Subscriber Data Answer message, the HSS sends Monitoring Indications for the UEs of the group to SCEF.

At step 316, MME keep watching the UE reachability for the UEs which was in the locationArea before monitoring duration expiration. It raises Monitoring Event if the UE within the locationArea is detected reachable.

It is noted that when UE moves out of the MME in the MME list, MME will delete this one-time UE reachability Monitoring Event.

At step 317, the MME/SGSN sends a Monitoring Indication (SCEF Reference ID(s), Monitoring Event Report, User Identity) message to the SCEF and delete monitoring event.

At step 318, the SCEF sends a NIDD Submit Request (User Identity, EPS Bearer ID, SCEF ID, non-IP data) message toward the MME/SGSN.

At step 319, the MME/SGSN pages the UE and delivers the non-IP data to the UE.

At step 320, the MME/SGSN sends a NIDD Submit Response message towards the SCEF acknowledging the NIDD Submit Request from SCEF.

At step 321, the SCEF sends a Group MT NIDD Submit Response message to the SCS/AS.

FIG. 3B shows a procedure for SCS/AS sending non-IP data to a group of UEs wherein the UE is outside the locationArea and later moves into the locationArea.

The step 311-314 are same as the FIG. 3A.

At step 3152, if there is UE handover from old MME to the new MME. The new MME sends Update Location Request (MME Identity, IMSI, MME Capabilities, equivalent PLMN list, ME Identity (IMEISV)) message to the HSS.

At step 3154, the HSS sends Update Location Answer message for the UE. If the UE is the member of group identified by External Group Identifier and the MME Identifier (MME ID) of the UE is in the MME list for Event Monitoring, the Monitoring Event Configuration (Monitoring Type=UE reachability, SCEF ID, SCEF Reference ID, Maximum Number of Reports=1, Monitoring Duration=Maximum Latency, locationArea) will be added into the Update Location Answer message.

The steps 316-321 are same as the steps 317-320 in the FIG. 3A.

Taking advantageous of the proposed solution can deliver NIDD MT message to a group UEs which are in the Geographic Area. It makes the SCS/AS more flexible to deliver the message to UEs in a customer defined Geographic Area in an efficient and simple way. It will be appreciated that although the exemplary embodiments described herein are mainly based on a SCEF and a HSS/SGSN; the proposed solution may be equally applicable for other suitable network nodes in the communication networks.

Figure 3C:
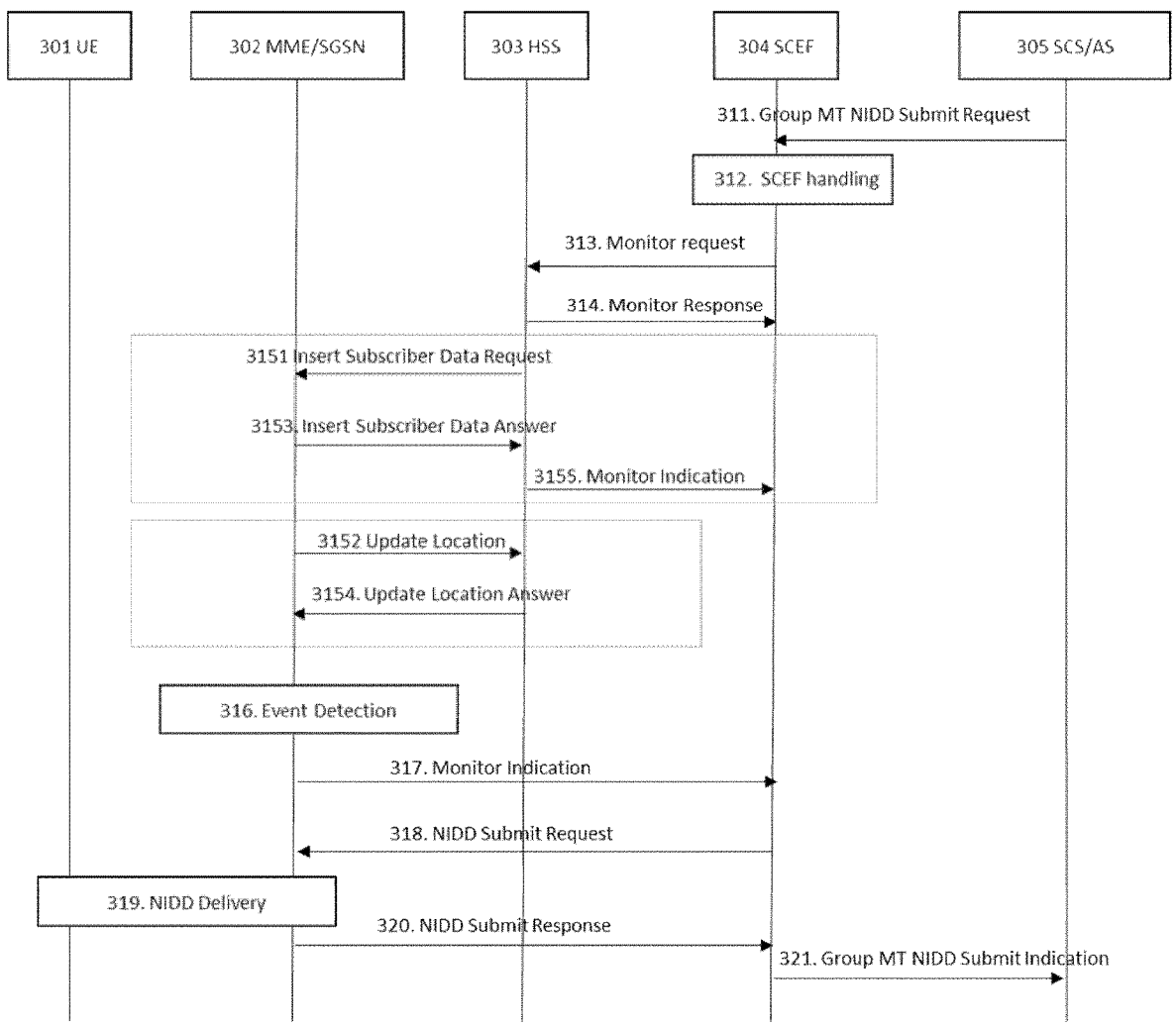
FIG. 3C is a flowchart showing a Group Message Delivery via unicast MT NIDD combined with the geographic area information.

FIG. 3C is a flowchart showing a Group Message Delivery via unicast MT NIDD combined with the geographic area information wherein combines the scenario FIG. 3A and FIG. 3B.

The step 311-314 are same as the FIG. 3A and/or FIG. 3B.

The step 3151, 3153, 3155 are same as the FIG. 3A. In general, the communication system manages large amount of UEs simultaneously, for the UEs which are already in the locationArea, step 3151-3153 will be applied and ignore step 3152-3154.

The step 3152, 3154 are same as the FIG. 3B. In general, the communication system manages large amount of UEs simultaneously, for the UEs which are outside the area and later move into the locationArea, step 3152-3154 will be applied and ignore step 3151-3153.

The steps 316-321 are same as the steps 317-320 in the FIG. 3A.

Figure 4:
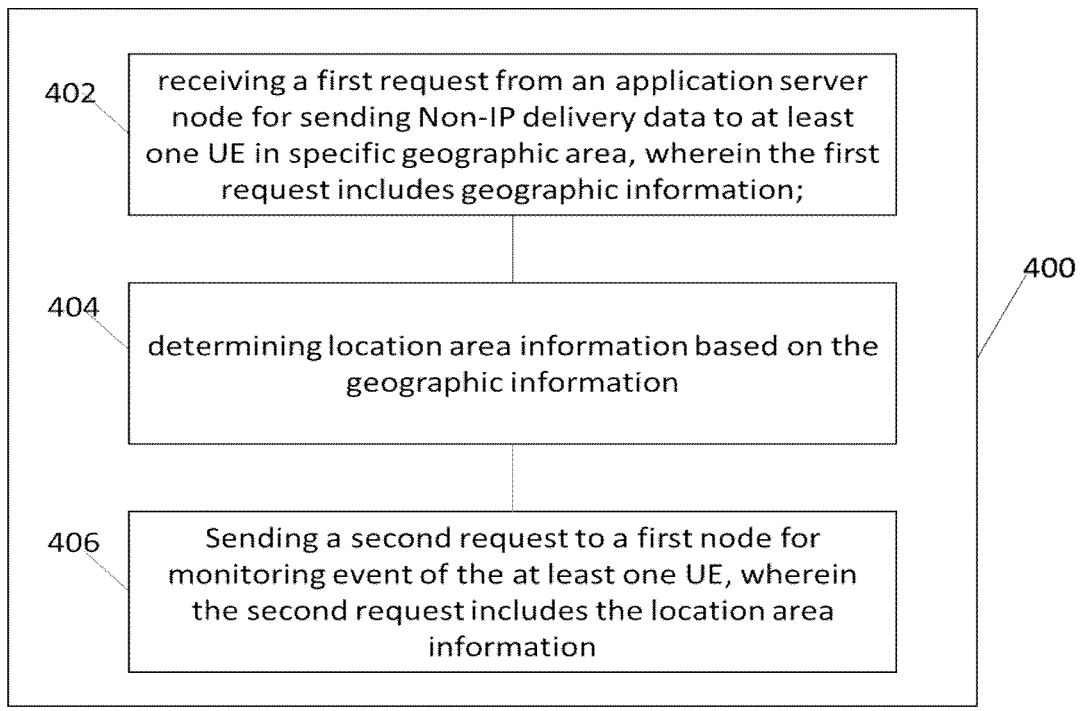
FIG. 4 is a flowchart illustrating a method according to some embodiments of the present disclosure.

FIG. 4 is a flowchart illustrating a method 400 according to some embodiments of the present disclosure. The method 400 illustrated in FIG. 4 may be performed by an Exposure Function or an apparatus communicatively coupled to the Exposure Function. In accordance with an exemplary embodiment, the Exposure Function may comprise a SCEF (such as the SCEF 104, 204, or 304), or any other suitable network function or instance which can act as Exposure Function.

According to the exemplary method 400 illustrated in FIG. 4, the Exposure Function 104, 204, 304 can receive a first request from application server 105, 205, 305, as shown in block 402. the Exposure Function 104, 204, 304 can get the geographic area information from the first request, the first request might be group MT NIDD submit request message and might comprise an external group identifier.

In accordance with some exemplary embodiments, the geographic area information might be telecom network ID such as cellId/enodeBId/routingAreaId/trackingAreaId, wherein the cellId indicates a Cell Global Identification of the user which identifies the cell the UE is registered; the eNodeBId indicates an eNodeB in which the UE is currently located, the routingAreaId identifies a Routing Area Identity of the user where the UE is located. The trackingAreaId identifies a Tracking Area Identity of the user where the UE is located.

In accordance with some exemplary embodiments, the geographic area information might be Longitude and Latitude and Altitude and a shape of area.

In accordance with some exemplary embodiments, the geographic area information might be a civic address of the user where the UE is located.

In accordance with some exemplary embodiments, the Exposure Function 104, 204, 304 can determine the locationArea based on the geographic information as shown in block 404. The locationArea might be a list of cells, eNodeBs and/or RAI(s)/TAI(s), etc.) and MME list. The MME list is the MME IDs for the geographic area.

In accordance with some exemplary embodiments, the Exposure Function 104, 204, 304 can transmit the second request to the first network node as shown in block 406. The first network node may comprise a HSS 103, 203 or 303. The second network node may comprise a MME/SGSN such as the MME/SGSN 102, 202 or 302.

In accordance with some exemplary embodiments, the second request might be Monitoring Request to configure the UE reachability Monitoring Event on the first network node and on the second network node. The message might include the parameters External Group Identifier, SCEF ID, SCEF Reference ID, Monitoring Type=UE reachability, Maximum Number of Reports=1, Monitoring Duration=Maximum Latency, locationArea, MME list. The Maximum Number of Reports is set to 1. So that the UE report to SCEF only one time, wherein the locationArea and/or MME list indicates the location information.

In accordance with some exemplary embodiments, if the first network node can find the MME list by itself based on locationArea, Exposure Function Node might not pass MME list to the first network node.

In response to receiving the second request, the first network node may transmit a Monitor Response to Exposure Function Node, so as to indicate the acknowledge acceptance of the Monitoring Request immediately. The Monitor Response might include parameters SCEF Reference ID and Cause.

In accordance with some exemplary embodiments, for the UEs with the same External Group Identifier, the first network node can determine the UE has been in the locationArea already or not.

In accordance with some exemplary embodiments, based on the result of the determination, if the UE has been in the locationArea, and if the MME ID of the UE is in the MME list, the first network node might send the Insert Subscriber Data Request (Monitoring Type=UE reachability, SCEF ID, SCEF Reference ID, Maximum Number of Reports=1, Monitoring Duration=Maximum Latency, locationArea) message to the second network node for the UE to configure one time monitoring event.

In response to receiving the Insert Subscriber Data Request message, the second network node may send the Insert Subscriber Data Answer to the first network node to accept the monitoring request.

In response to receiving the Insert Subscriber Data Answer message from the second network node, the first network node may send the Monitor Indication to the Exposure Function to indicate that monitoring event has been started in the second network node.

In accordance with some exemplary embodiments, based on the result of the determination, if the UE is not in the locationArea, the first network node might receive the Update Location Request (MME Identity, IMSI, MME Capabilities, equivalent PLMN list, ME Identity (IMEISV)) message from the second network node when the UE moves into the locationArea.

In response to receiving the Update Location Request message from the second network node, the first network node may send the Update Location Answer to the first network node. If the UE is the member of group identified by External Group Identifier and the MME ID of the UE is in the MME list for Event Monitoring, the Monitoring Event Configuration (Monitoring Type=UE reachability, SCEF ID, SCEF Reference ID, Maximum Number of Reports=1, Monitoring Duration=Maximum Latency, locationArea) will be added into the Update Location Answer message.

In accordance with some exemplary embodiments, the second network node keeps watching the UE reachability for the UEs which has been in the locationArea before monitoring duration expiration. It raises Monitoring Event if the UE within the locationArea is detected reachable. Each UE only report one time due to the Maximum Number of Reports is 1.

In accordance with some exemplary embodiments, the second network node sends a Monitoring Indication (SCEF Reference ID(s), Monitoring Event Report, User Identity) message to the Exposure Function to indicate the UE within the locationArea is detected reachable and delete monitoring event.

In accordance with some exemplary embodiments, the Exposure Function can send a NIDD Submit Request (User Identity, EPS Bearer ID, SCEF ID, non-IP data) message toward the second network node 102, 202, 302 when the UE is reachable.

In response to receiving the NIDD Submit Request, the second network node 102, 202, 302 may transmit a NIDD Submit Response message to Exposure Function 104, 204, 304. The second network node 102, 202, 302 can page the UE and delivers the non-IP data to the UE.

In accordance with some exemplary embodiments, the Exposure Function can send a Group MT NIDD Submit Indication message toward the AS/SCS 105, 205, 305 so as to indicate status for each UE identified by either External Identifier or MSISDN is included.

In accordance with some exemplary embodiments, when the UE moves out of the locationArea, the second network node deletes this one-time UE reachability Monitoring Event.

Figure 5:
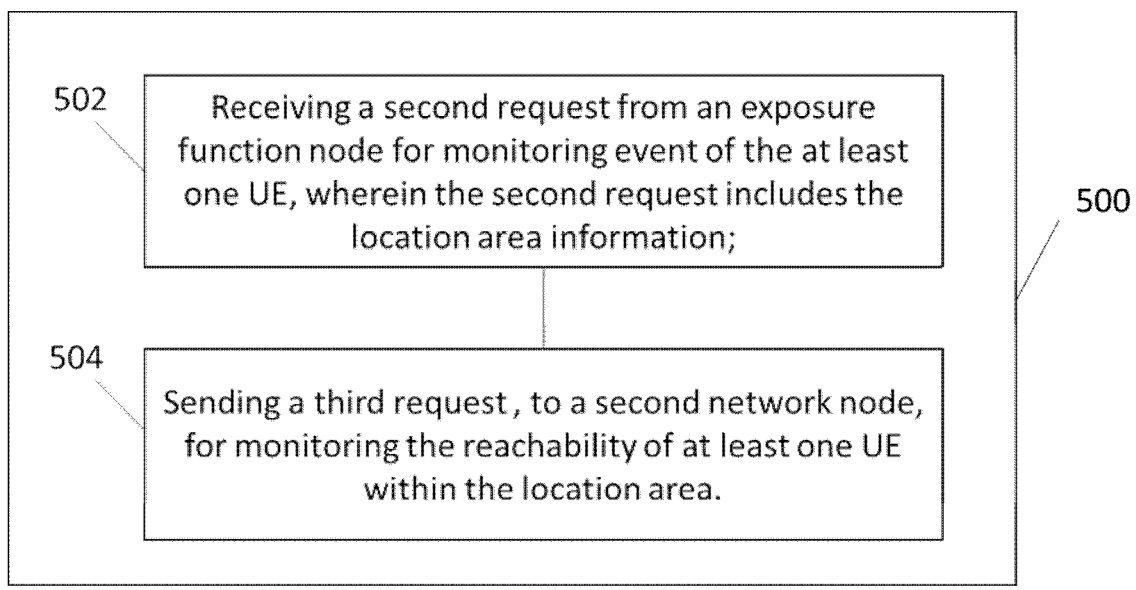
FIG. 5 is a flowchart illustrating another method according to some embodiments of the present disclosure.

FIG. 5 is a flowchart illustrating a method 500 according to some embodiments of the present disclosure. The method 500 illustrated in FIG. 5 may be performed by a first network node or an apparatus communicatively coupled to the first network node. In accordance with an exemplary embodiment, the first network node may comprise a HSS (such as the HSS 103, 203 or 303), or any other suitable network function or instance which can indicate the first network node as described in connection with FIG. 5.

According to the exemplary method 500 illustrated in FIG. 5, the first network node 103, 203, 303 may receive a second request from the exposure function (such as the SCEF 104, 204, or 304), as shown in block 502 wherein the a second request might be monitor request. The first network node 103, 203, 303 might accept the monitor request, then send the Monitor Response to the Exposure Function 104, 204, or 304 as shown in block 504.

In accordance with some exemplary embodiments, the second request might further comprise an external group identifier and a mobility management entity, MIME, list, locationArea;

It is noted that, in accordance with some exemplary embodiments, the second request might not comprise a mobility management entity list when the first network node can decide it according to the locationArea.

In accordance with some exemplary embodiments, the first network node 103, 203, 303 may determine whether the UE is in the location area. Based on the result of the determination of the UE in the location area, the first network node 103, 203, 303 may transmit the third request to the second network node 102, 202, 302 when the UE is already in the loactionArea. The third request message might be the Insert Subscriber Data Request wherein the message might comprise the location area information, external group identifier.

In accordance with some exemplary embodiments, the first network node 103, 203, 303 may receive Insert Subscriber Data Answer from the second network node 102, 202, 302 when the UE is already in the loactionArea.

In response to receiving the Insert Subscriber Data Answer from the second network node 102, 202, 302, the first network node 103, 203, 303 may send Monitoring Indications to the Exposure Function.

Alternatively, in accordance with some exemplary embodiments, based on the result of the determination, the first network node 103, 203, 303 may receive the Update Location from the second network node 102, 202, 302 when the UE is outside of the locationArea.

In response to receiving the Update Location from the second network node 102, 202, 302, the first network node 103, 203, 303 may send Update Location Answer to the second network node with the Monitoring Event Configuration.

It is noted that when UE moves out the location Area, the second network node 102, 202, 302 stops the monitoring.

Figure 6:
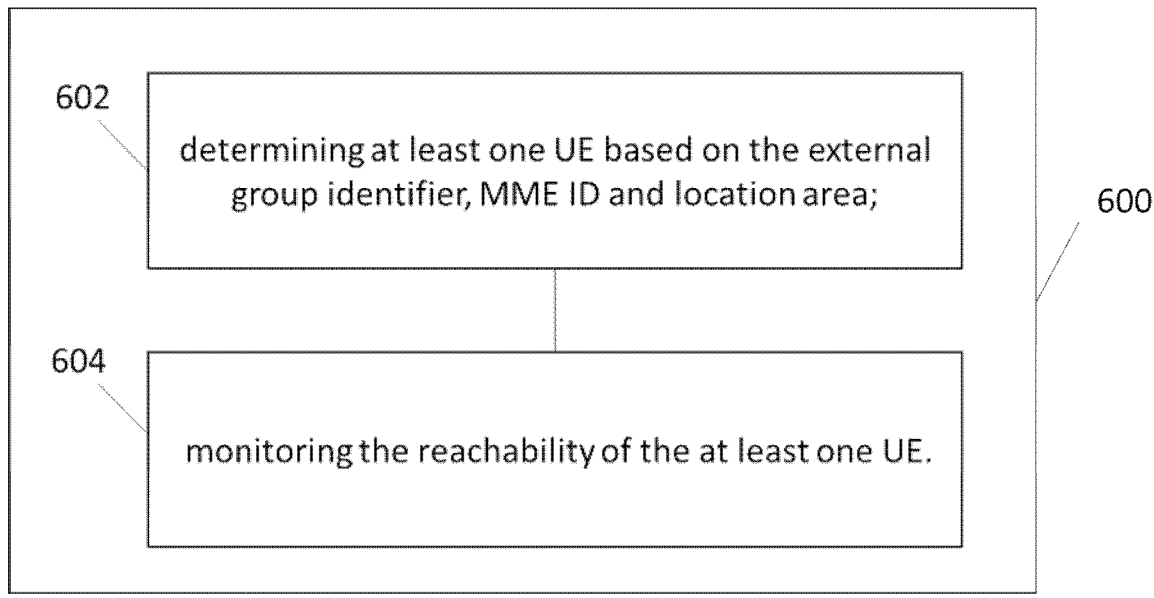
FIG. 6 is a flowchart illustrating yet another method according to some embodiments of the present disclosure.

FIG. 6 is a flowchart illustrating a method 600 according to some embodiments of the present disclosure. The method 600 illustrated in FIG. 6 may be performed by a second network node or an apparatus communicatively coupled to the second network node. In accordance with an exemplary embodiment, the second network node may comprise a MME/SGSN (such as the MME/SGSN 102, 202 or 302), or any other suitable network function or instance which can indicate the first network node as described in connection with FIG. 6.

According to the exemplary method 600 illustrated in FIG. 6, the second network node 102, 202, 302 may determine at least one UE based on the external group identifier, MME ID and location area as shown in block 602; The second network node 102, 202, 302 keep monitoring the reachability of the at least one UEs, as shown in block 604.

According to the exemplary method 600 illustrated in FIG. 6, as described in FIG. 4 in response to Insert Subscriber Data Request from the first network node 103, 203, 303, the second network node 102, 202, 302 may send the insert subscriber data answer to the first network node 103, 203, 303.

Alternatively, the second network node 102, 202, 302 may send update location to the first network node 103, 203, 303 when UE move into the location area.

The second network node 102, 202, 302, may receive update location answer from the first network node 103, 203, 303 with the Monitoring Event Configuration.

In accordance with some exemplary embodiments, the second network node 102, 202, 302, keeps watching the UE reachability status and sends monitoring indication (SCEF Reference ID(s), Monitoring Event Report, User Identity) to the exposure function 104, 204, 304 when the UE is reachable and delete monitoring event.

The second network node 102, 202, 302, may receive NIDD Submit Request from the exposure function 104, 204, 304 and start MT NIDD delivery to the UE.

The second network node 102, 202, 302, may send NIDD Submit Response to the exposure function 104, 204, 304 and stop the one-time monitor event.

Figure 7:
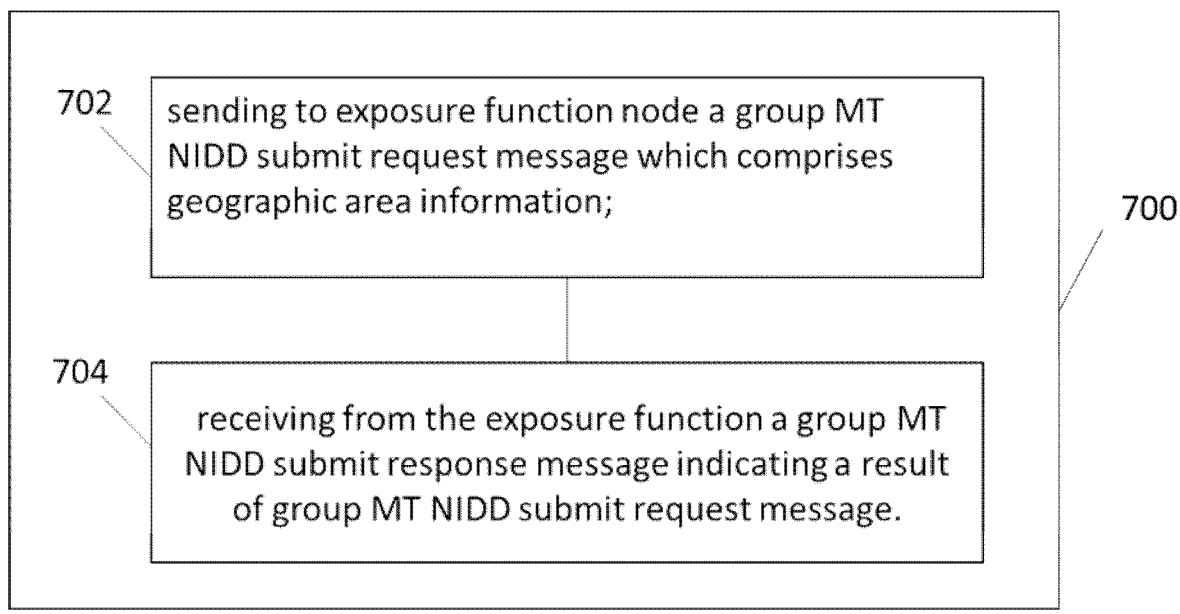
FIG. 7 is a flowchart illustrating a further method according to some embodiments of the present disclosure.

FIG. 7 is flowchart illustrating a method 700 according to some embodiments of the present disclosure. The method 700 illustrated in FIG. 7 may be performed by an application server or an apparatus communicatively coupled to the application server. In accordance with an exemplary embodiment, the application server may comprise a SCS/AS (such as SCS/AS 105, 205 or 305), or any other suitable network function or instance which can indicate the first network node as described in connection with FIG. 7.

According to the exemplary method 700 illustrated in FIG. 7, the application server 105, 205, 305 may send the group MT NIDD submit request message to the exposure function 104, 204, 304, as shown in block 702.

The application server 105, 205, 305 may receive the group MT NIDD submit indication message from the exposure function 104, 204, 304, as shown in block 704.

The various blocks shown in FIGS. 3A-7 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 8:
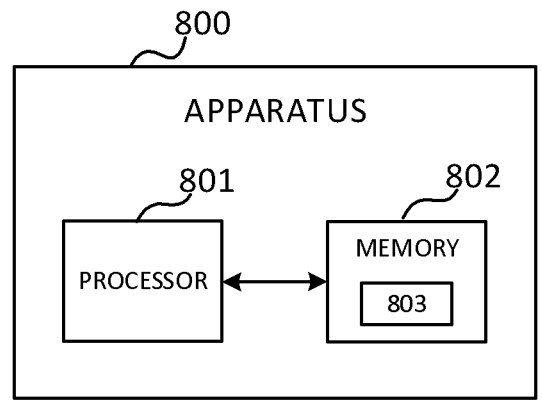
FIG. 8 is a block diagram illustrating an apparatus according to some embodiments of the present disclosure.

FIG. 8 is a block diagram illustrating an apparatus 800 according to various embodiments of the present disclosure. As shown in FIG. 8, the apparatus 800 may comprise one or more processors such as processor 801 and one or more memories such as memory 802 storing computer program codes 803. The memory 802 may be non-transitory machine/processor/computer readable storage medium. In accordance with some exemplary embodiments, the apparatus 800 may be implemented as an integrated circuit chip or module that can be plugged or installed into a exposure function node as described with respect to FIG. 4, a first network node as described with respect to FIG. 5, a second network node as described with respect to FIG. 6, or an application server as described with respect to FIG. 7.

In some implementations, the one or more memories 802 and the computer program codes 803 may be configured to, with the one or more processors 801, cause the apparatus 800 at least to perform any operation of the method as described in connection with FIG. 4. In some implementations, the one or more memories 802 and the computer program codes 803 may be configured to, with the one or more processors 801, cause the apparatus 800 at least to perform any operation of the method as described in connection with FIG. 5. In some implementations, the one or more memories 802 and the computer program codes 803 may be configured to, with the one or more processors 801, cause the apparatus 800 at least to perform any operation of the method as described in connection with FIG. 6. In other implementations, the one or more memories 802 and the computer program codes 803 may be configured to, with the one or more processors 801, cause the apparatus 800 at least to perform any operation of the method as described in connection with FIG. 7.

Alternatively, or additionally, the one or more memories 802 and the computer program codes 803 may be configured to, with the one or more processors 801, cause the apparatus 800 at least to perform more or less operations to implement the proposed methods according to the exemplary embodiments of the present disclosure.

Figure 9:
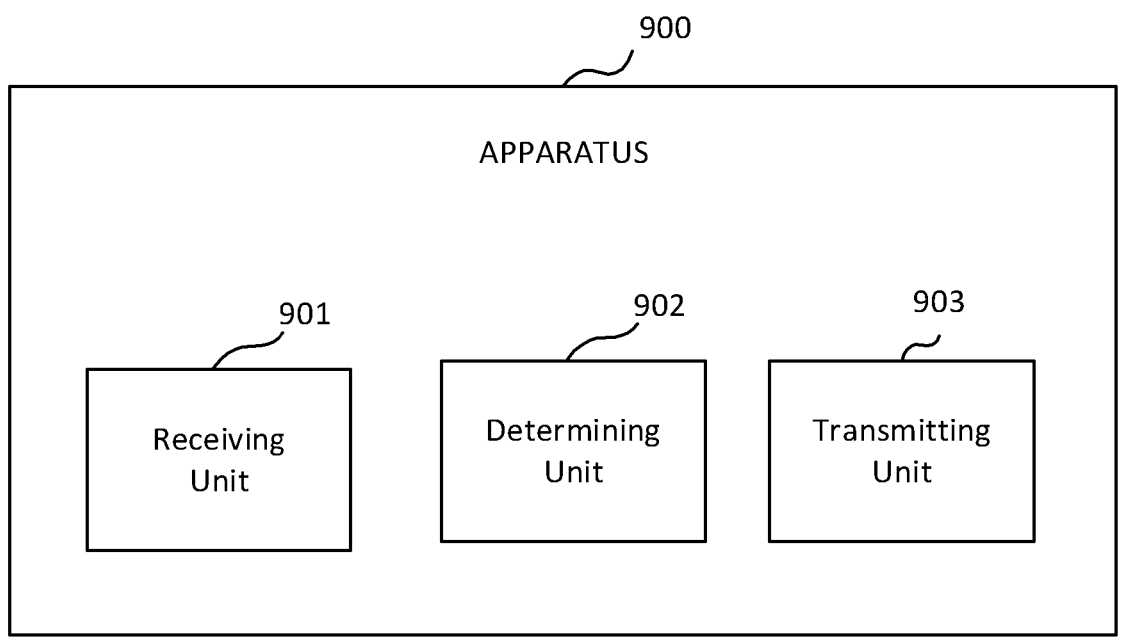
FIG. 9 is a block diagram illustrating another apparatus according to some embodiments of the present disclosure.

FIG. 9 is a block diagram illustrating an apparatus 900 according to some embodiments of the present disclosure. The apparatus 900 may be implemented as an exposure function node or as a part of the exposure function node. As shown in FIG. 9, the apparatus 900 may comprise a receiving unit 901, determining unit 902 and a transmitting unit 903. In an exemplary embodiment, the apparatus 900 may be implemented in an exposure function node such as a SCEF. The receiving unit 901 may be operable to carry out the operation in block 402, determining unit 902 may be operable to carry out the operation in block 404, and the transmitting unit 903 may be operable to carry out the operation in block 406. Optionally, receiving unit 901, the determining unit 902 and/or transmitting unit 903 may be operable to carry out more or less operations to implement the proposed methods according to the exemplary embodiments of the present disclosure.

Figure 10:
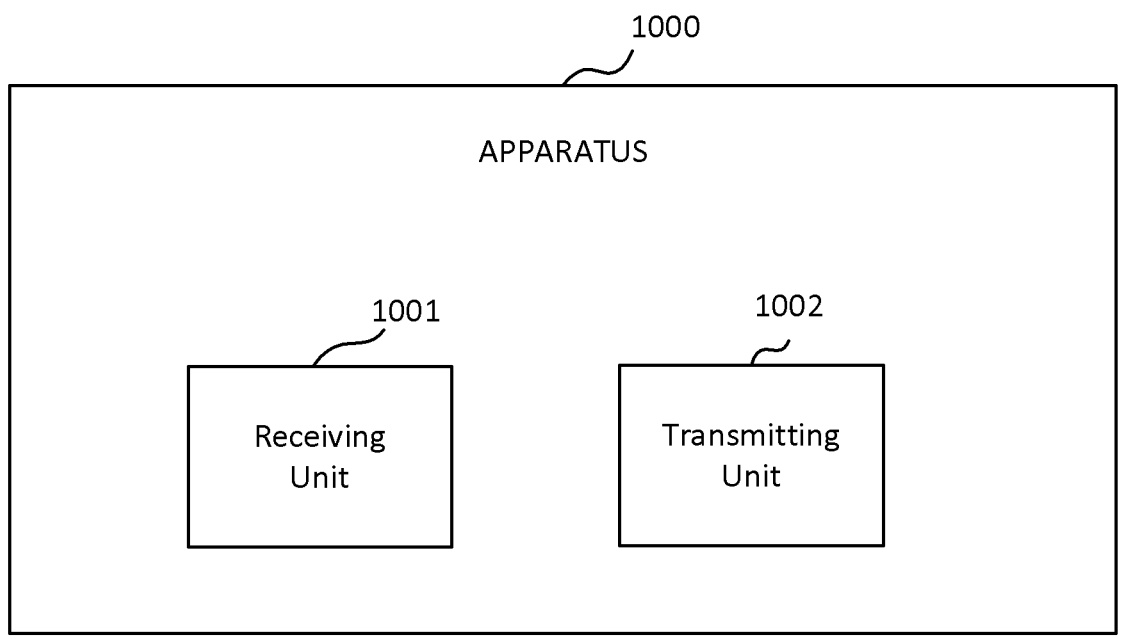
FIG. 10 is a block diagram illustrating another apparatus according to some embodiments of the present disclosure.

FIG. 10 is a block diagram illustrating an apparatus 1000 according to some embodiments of the present disclosure. The apparatus 1000 may be implemented as a first network node or as a part of the first network node. As shown in FIG. 10, the apparatus 1000 may comprise a receiving unit 1001 and transmitting unit 1002. In an exemplary embodiment, the apparatus 1000 may be implemented in a first network node such as a HSS. The receiving unit 1001 may be operable to carry out the operation in block 502 and transmitting unit 1002 may be operable to carry out the optional operation in block 504. Optionally, the receiving unit 1001 and/or transmitting unit 1002 may be operable to carry out more or less operations to implement the proposed methods according to the exemplary embodiments of the present disclosure.

Figure 11:
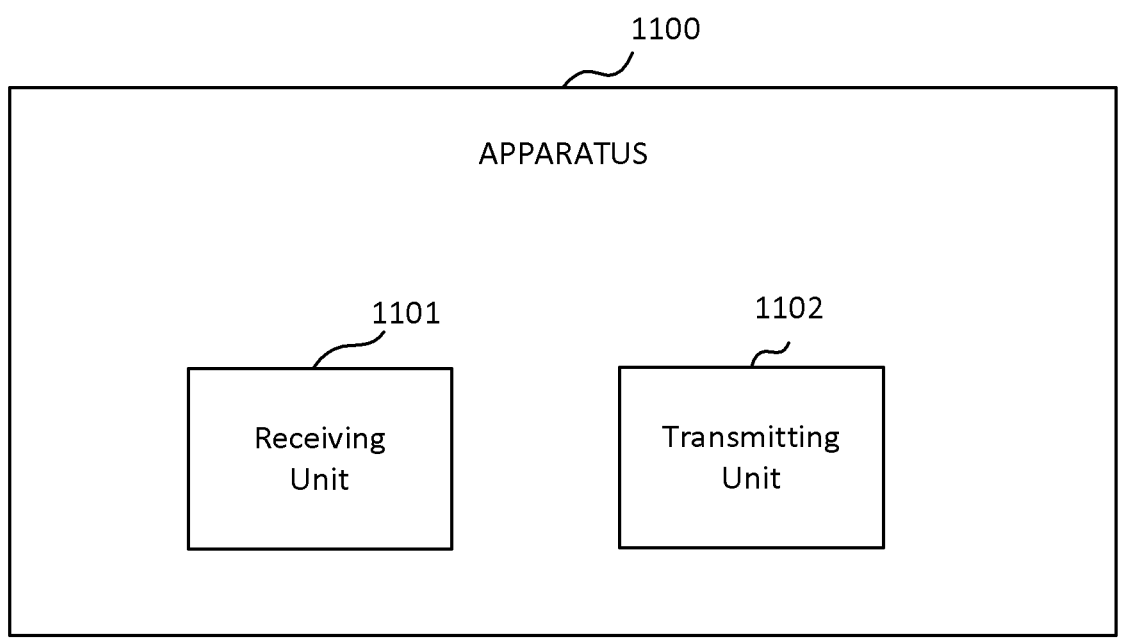
FIG. 11 is a block diagram illustrating another apparatus according to some embodiments of the present disclosure.

FIG. 11 is a block diagram illustrating an apparatus 1100 according to some embodiments of the present disclosure. The apparatus 1100 may be implemented as a second network node or as a part of the second network node. As shown in FIG. 11, the apparatus 1100 may comprise a receiving unit 1101 and transmitting unit 1102. In an exemplary embodiment, the apparatus 1100 may be implemented in a second network node as HSS/SGSN. The receiving unit 1101 may be operable to carry out the operation in block 602, transmitting unit 1102 may be operable to carry out the operation part in block 604. The receiving unit 1101 and/or the transmitting unit 1102 may be operable to carry out more or less operations to implement the proposed methods according to the exemplary embodiments of the present disclosure.

Figure 12:
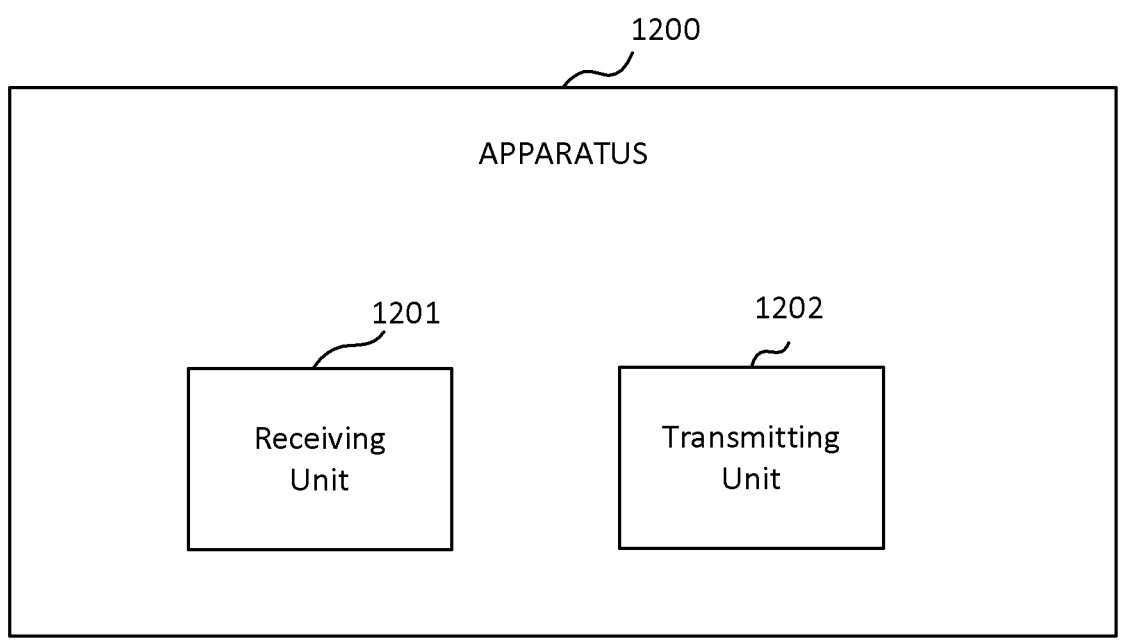
FIG. 12 is a block diagram illustrating a further apparatus according to some embodiments of the present disclosure.

FIG. 12 is a block diagram illustrating an apparatus 1200 according to some embodiments of the present disclosure. The apparatus 1200 may be implemented as an application server or as a part of the application server. As shown in FIG. 12, the apparatus 1200 may comprise a receiving unit 1201 and transmitting unit 1202. In an exemplary embodiment, the apparatus 1200 may be implemented in an application server such as a SCS/AS. The receiving unit 1201 may be operable to carry out the operation in block 702 and transmitting unit 1202 may be operable to carry out the optional operation in block 704. Optionally, the receiving unit 1201 and/or transmitting unit 1202 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at an exposure function node in a wireless communication network, comprising:
   receiving, from an application server node, a first request for sending Non-IP delivery data to at least one user equipment, UE, in a specific geographic area, the first request including geographic information;
   determining location area information based on the geographic information; and
   sending, to a first node, a second request for a monitoring event of the at least one UE, the second request including the location area information, the second request requesting monitoring of the monitoring event in a location according to the location area information, the second request further comprising a Mobile Management Entity, MME, list.

2. The method according to claim 1, wherein the first request comprises:
   an external group identifier.

3. The method according to claim 1, wherein the first request is a group mobile-terminated Non-IP data delivery, NIDD, submit request message.

4. The method according to claim 1, further comprising:
   receiving, from a second network node, a monitoring indication message indicating a reachability of the at least one UE within the location area.

5. The method according to claim 4, further comprising:
   sending, to the second network node, a non-IP data submit request message.

6. The method according to claim 5, further comprising:
   receiving, from the second network node, a NIDD submit response message; and sending, toward the application server, a group MT NIDD submit response message.

7. A method implemented at a first network node in a wireless communication network, comprising:
   receiving, from an exposure function node, a second request for a monitoring event of at least one UE, the second request including location area information, the second request requesting monitoring of the monitoring event in a location according to the location area information, the second request further comprising a mobility management entity, MME, list; and
   sending, to a second network node, a third request for monitoring a reachability of at least one UE within a location area associated with the location area information.

8. The method according to claim 7, wherein the second request further comprises:
   an external group identifier.

9. The method according to claim 7, further comprising:
   determining a Mobile Management Entity, MME, list based on the location area information.

10. The method according to claim 7, further comprising:
    determining the second network node based on the MME list.

11. The method according to claim 7, further comprising:
    sending, toward the exposure function node, a monitoring response message indicating acknowledge acceptance of the monitoring request.

12. The method according to claim 11, further comprising:
    receiving, from the second network node, an insert subscriber data answer message indicating acceptance of the third request.

13. The method according to claim 7, wherein the third request comprises:
a location area information, external group identifier.

14. The method according to claim 7, further comprising:
receiving, from the second network node, an update location Request message indicating a new UE handover into a range of the second network node.

15. The method according to claim 14, further comprising:
determining a monitoring event configuration based on an external group identifier and a Mobile Management Entity, MME, ID; and
sending, toward the second network node, an update location answer message with the monitoring event configuration and the location area information.

16. An exposure function node in a wireless communication network, comprising:
one or more processors; and
one or more memories containing computer program codes executable by said one or more processors, whereby said exposure function node is operative to:
receive, from an application server node, a first request for sending data to at least one user equipment, UE, in a specific geographic area, the first request including geographic information;
determine location area information based on the geographic information; and
send, to a first node, a second request for a monitoring event of the at least one UE, the second request including the location area information, the second request requesting monitoring of the monitoring event in a location according to the location area information, the second request further comprising a Mobile Management Entity, MME, list.

* * * * *